April 15, 1969     C. O. DENNIS     3,438,090

STAND FOR TIRE MATRICES

Filed Jan. 19, 1966

INVENTOR

CLEMENT O. DENNIS

BY Mason, Fenwick & Lawrence

ATTORNEYS

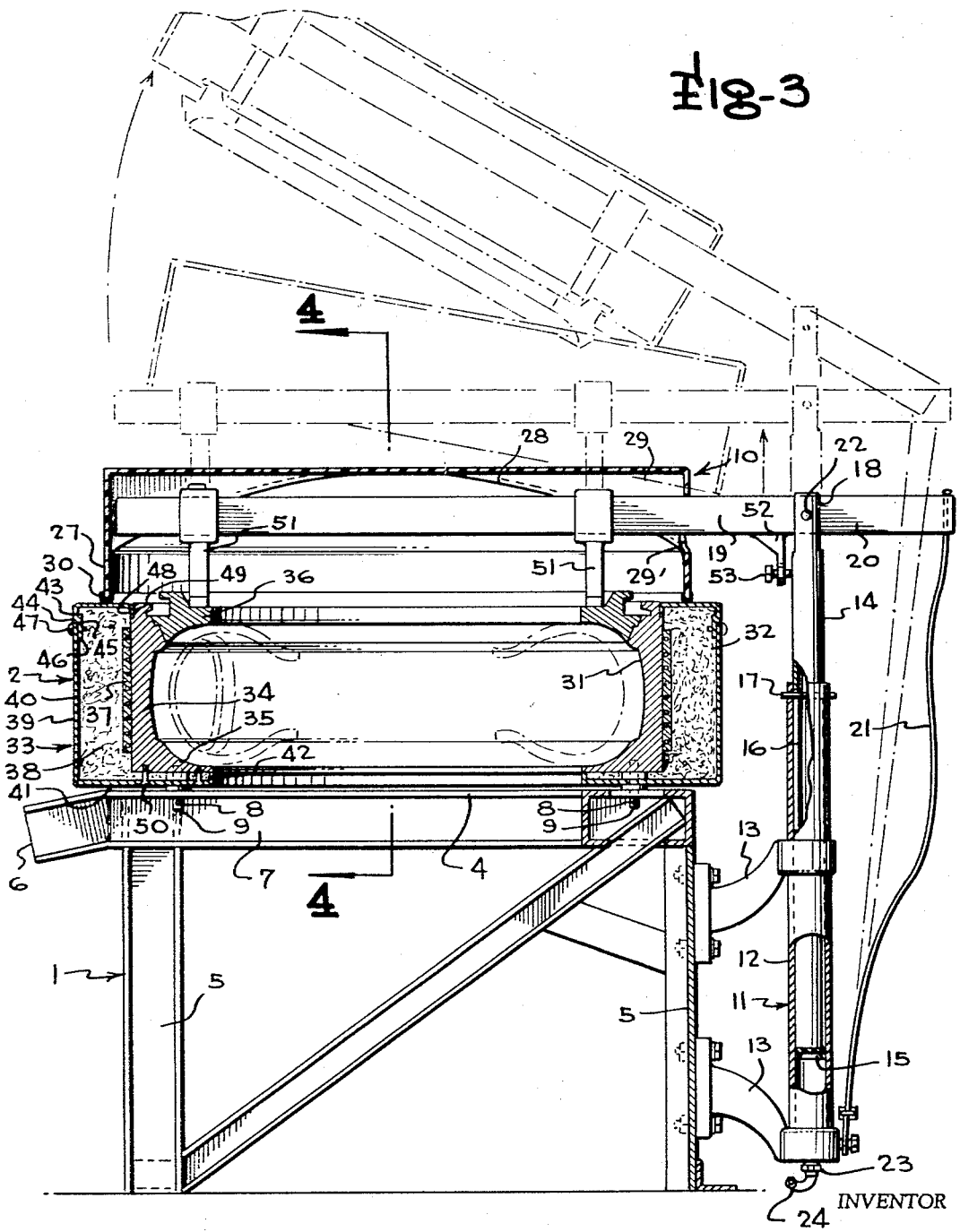

United States Patent Office 3,438,090
Patented Apr. 15, 1969

3,438,090
STAND FOR TIRE MATRICES
Clement O. Dennis, Macon, Ga., assignor to Super Mold Corporation of California, Lodi, Calif., a corporation of California
Filed Jan. 19, 1966, Ser. No. 521,732
Int. Cl. B29h *5/04, 17/37*
U.S. Cl. 18—18                                6 Claims

ABSTRACT OF THE DISCLOSURE

A stand for a tire recapping matrix of the type having a removable top flange, wherein the stand has a pivotally mounted dome to overlie a matrix on the stand to retain curing heat, which dome carries the matrix top flange and is raised and lowered with the flange by power means. The matrix has a peripheral heat coil housing of plastic in two parts, with one part being secured to the matrix and the second part to the first.

---

This invention relates to recapping apparatus, and is an improvement over the device disclosed in United States Patent No. 3,166,787, to Dennis et al., issued Jan. 26, 1965.

The prior patent discloses a stand, or support, upon which a recapping matrix may be supported in predetermined position in continuous connection to a source of heat, and a portable loader that can be moved to the stand and fixed in relation to the matrix position to load tires into the matrix or remove them therefrom. The stand has means to guide the loader into supported, predetermined position thereon so that the two become an integral piece of equipment during matrix loading and unloading.

The general object of the present invention is to provide an improved stand and matrix which will retain the curing heat within the apparatus to increase efficiency of the mold and decrease heat dissipation to the mold room.

A more specific object is to provide the matrix with an improved, heat-retaining shell, and the stand with a matrix-covering, heat-retaining dome to prevent the escape of curing heat.

Another object of the invention is to provide the stand with a dome which is liftable and swingable from over the matrix, and with which the matrix top ring may be raised and lowered to facilitate removal and reinserting of the top ring.

Other objects of the invention will become apparent from the following description of one practical embodiment of the invention, when taken in combination with the drawings which accompany, and form part of, this specification.

Figure 1:
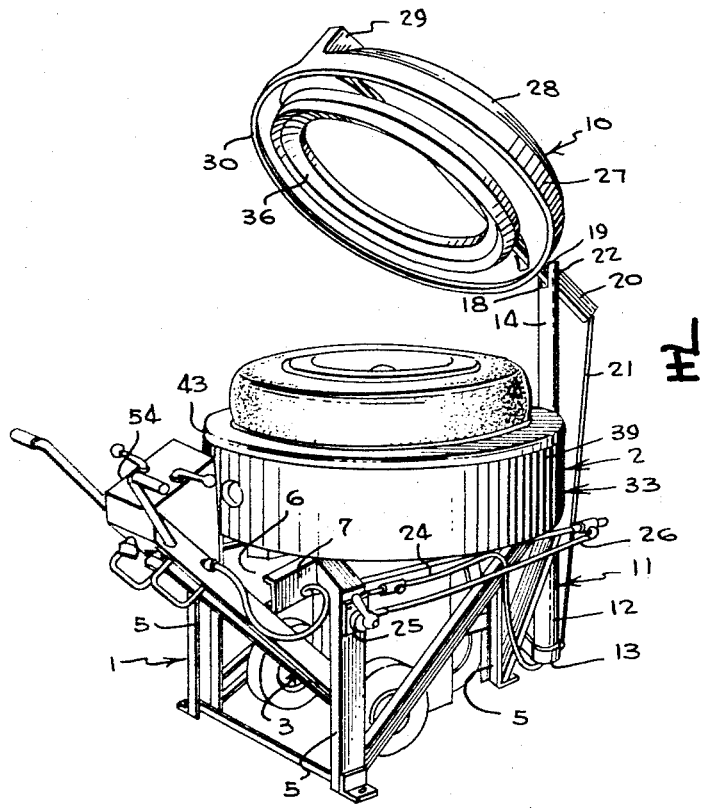
FIGURE 1 is a perspective view of the improved stand and matrix, with a portable loader shown in place on the stand and the dome raised.
Figure 4:
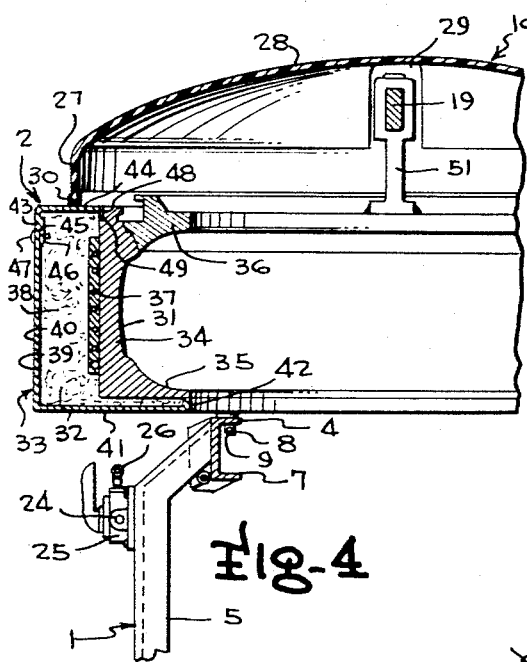
Figure 2:
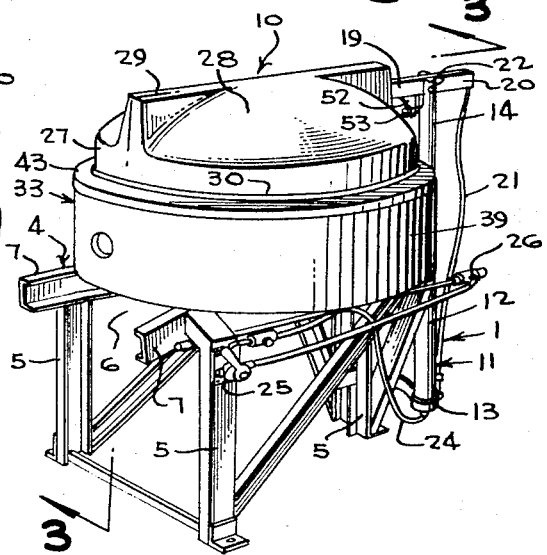
FIGURE 2 is a similar view with the dome lowered for curing and the loader removed.

FIGURE 3 is a vertical section through the stand and matrix, the dome being shown in full lines seated in the matrix, and in one dotted line position raised above the matrix, and in a second dotted line position tilted upwardly to permit insertion, or removal of a tire, and is taken on the line 3—3 of FIGURE 2; and FIGURE 4 is a vertical section through the upper portion of the stand and the matrix, and is taken on the line 4—4 of FIGURE 3.

Referring to the drawings in detail, the apparatus illustrated consists of a stand 1 to support a recapping matrix 2, and a tire loader 3. While the stand and loader constitute a single apparatus for supporting, loading and unloading a tire matrix, the two are separable, and the loader is portable so that it may be removed from the stand for use with other matrices or other stands. The stand and loader form the subject matter of the above mentioned Patent No. 3,166,787, and that patent can be referred to for the details of the loader and the construction of the stand insofar as the loader-supporting and loader-positioning features of the stand are concerned.

For this application it is only necessary to state that the stand has a matrix supporting bed 4, mounted upon legs 5, which is U-shaped and open at the front 6 to permit entry of the loader. The bed has two channel members 7 arranged in spaced, parallel relation to form guide tracks for the loader. The stand bed is provided with suitable openings (not shown) to receive studs 8 projecting downwardly from the bottom of the matrix 2. Cotter pins 9, through the studs, fix the matrix to the stand.

Loader 3 carries two axially aligned piston rods which support lower and upper bead wheels to engage the beads of a tire and pull them together over a backup rim within the tire to reduce the tire diameter for insertion in, or removal from, the matrix. After reducing the tire diameter, the piston rods may be raised or lowered simultaneously to lift or lower the tire in well-known manner. All of this is described in detail in the above-mentioned patent, and in United States Patent No. 3,200,443 to Maddox et al., issued Aug. 17, 1965.

The present invention is concerned with a dome 10, movably supported on a telescopic post 11 mounted at the back of stand 1 and adapted to overlie a matrix on the stand. The dome is carried by means which also carries the top ring of the matrix, as will be described.

Supporting post 11 includes a stationary bottom section 12, which is held vertically by two brackets 13 which embrace the section 12 and are fastened to the legs 5 at the rear of the stand. The section 12 is hollow, and forms a cylinder into which an upper section 14 telescopes. The upper section is fitted with a piston cup 15 at its bottom end for sealing engagement with the inner wall of the cylinder bottom section 12. The piston upper section is slotted, as at 16, and receives a retaining pin 17 that has its ends seated in the cylinder wall. Pin 17 limits the vertical movement of the upper section 14. The top of the upper section 14 is bifurcated as at 18, to receive a dome lifting arm 19. This arm traverses the dome, and is secured to it at the back end and projects rearwardly through the bifurcated end 18 of the piston upper section to terminate at some distance to the rear of the vertical supporting post. The rearwardly overhanging end 20 of the lifting arm is tethered by a cable 21 to the bottom bracket 13 mounting the post. The cable is sufficiently long to provide some slack when the dome is seated on the matrix and allow some upward movement of the lifting bar before the tether becomes taut, as will be described in detail. A pivot pin 22 secures the lifting arm to the upper post section 14.

The bottom of lower post section 12 carries an air fitting 23, to which a hose line 24 is connected. The other end of hose 24 is connected to a suitable control valve 25 which will admit fluid to, and release it from, the bottom section of the post to raise and lower the upper section. A line 26 is coupled to the valve and connectable to a suitable source of fluid under pressure. Valve 25 can be mounted at any convenient place on the stand, such as at the upper end of one of the support legs 5, as shown.

The dome may take any desirable shape, and is shown as a molded plastic member having a circular rim 27, which seats on the matrix, and a top 28 of spherical curvature. An upstanding fin 29 extends diametrically across the top and provides a housing for the lifting arm 19. A gasket 30 is fitted over the bottom edge of the dome for sealing contact with the matrix top. The dome diameter is such that the dome will surround and house the upper end of the mold portion of the matrix 2. Arm 19 lies within the fin 29 when the dome is in seated position. The arm extends through an opening 29' at the rear of the dome, which opening is larger than the arm to allow some tilting and sliding movement of the dome relative to the arm.

Matrix 2 consists of a ring-type mold 31, surrounded by an annular heating chamber 32, housed within a cover 33. The mold proper is more or less conventional, having an annular central tread forming section 34 to which is fixed a lower flange 35. The upper flange 36 is a removable ring, which can be taken out to allow entry, or removal, of a tire. The heating chamber carries a heating element 37, which may be an electric coil, steam coil, etc., against the outer periphery of mold 31, and the remainder of the chamber is filled with suitable insulation 38.

The cover 33 is of two-part molded plastic construction. The lower part 39 has a circular vertical wall 40 and a horizontal bottom flange 41. Flange 41 is sufficiently wide to underlie the entire bottom flange of the mold, to space the mold from the stand. The inner edge of the cover section 39 has an upstanding, spacing flange 42 upon which the inner edge of the lower flange 35 of the mold rests to hold the mold out of contact with the stand to prevent heat transfer to the stand. The upper part 43 of the cover has a vertical wall 44 with a seat 45 at its bottom to receive the upper end of the vertical wall 40 of the lower cover part. The seat is formed by an inset flange 46, which lies behind the lower part vertical wall to hold the two parts in superimposed relation. Screws 47 through wall 40 and flange 46 hold the two parts together. The upper part has an inner, downturned flange 48 which fits into a rabbeted seat 49 in the back wall of the mold. Screws 50 through the bottom flange 41 of the lower cover part into the bottom flange 35 of the mold fixes the lower cover part to the mold.

The plastic cover replaces the former upper and lower wooden rings and metal surround which formed the insulating members and heating chamber. The plastic cover provides better spacing for the mold from the stand, a tighter fitting cover, and may be furnished in colors, so that matrices of different tread patterns, different sizes, etc., may be identified quickly.

The dome 10 and its lifting structure serve a two-fold purpose, providing a heat-retaining housing for the matrix, and a means for removing and inserting the upper ring 36 of the tire mold. To this latter end, the lifting bar 19 carries hangers 51 which are secured to the upper ring 36. Thus, when the arm 19 is raised, the ring will be lifted.

Due to the fact that it is desired to first raise the dome and mold ring axially of the matrix and then tilt them, as will be described, a stop is provided on the lift arm 19 for contact with the vertical post. The stop consists of an arm 52, secured to the underside of the lift arm, through which a limit screw 53 is threaded. The screw is adjusted in the arm so that when the screw end is in contact with the upper section 14 of post 11 the lift arm will be held horizontal, with the dome resting on the matrix cover 33 and the ring 36 seated in the mold center section 34.

When the device is to be used, the forward edge of dome 10 will be raised to tilt the dome about the arm 19 at the opening 29', and pushed backward until the forward edge of the dome rests in the top of arm 19, as shown in dotted lines in FIGURE 3. This will allow access to the mold ring lock (not shown) to release the mold upper ring. Then, valve 25 will be operated to cause pressure fluid flow to the bottom of section 12 of post 11 to lift arm 19 and dome 10. Dome 10 and the ring 36 will rise vertically due to the contact of limit stop screw 53 with post 11, thus maintaining the axial relationship between the matrix and the removable ring.

Because of this, the ring will lift smoothly from the central portion of the mold for ease of removal and to protect the mold pattern on the ring face. When the assembly has reached a predetermined upper level, such, for example, as shown in the horizontal dotted line position of FIGURE 3, the tether cable 21 will become taut preventing further upward movement of that end of the lift arm to which it is attached. As the upper section of the post continues to rise, the lift arm will be tilted about its pivot 22, so that the dome and ring will assume a tilted position, leaving the free end open to receive a tire.

If the loader is not in place in the stand, it will be rolled to the stand and its guides inserted into the channel ends forming the open front 6 of the matrix bed 4. The loader will ride up the inclined channel ends to its operative position on the bed. The loader controls 54 will then be operated to cause its pistons to rise through the matrix center. The lower bead wheel will be in place on its piston rod, and a tire to be recapped will be placed on this wheel. The top bead wheel is then positioned on top of the tire and connected to its piston. Controls 54 will be moved to cause the upper bead wheel to be drawn downwardly, thus compressing the tire beads to reduce the tire diameter in known manner. When the tire diameter is reduced sufficiently, the tire is lowered into the matrix. The upper bead wheel is raised to allow the tire rubber to seat in the matrix tread design. The upper bead wheel is removed, the loader members retracted, and the loader can be removed from the stand if desired. Valve 25 is again manipulated to lower the ring and dome. As section 14 of the post begins its downward movement, the end of lift arm 19 is still under the control of tether cable 21, so that the arm will swing about its pivot to lower the dome and ring to horizontal position. This position will be reached and stop screw 53 will contact post 11 to hold the members horizontal, while the ring is still spaced from the top of the matrix. Continued downward movement of section 14 of the post will allow the ring 34 to settle gently and precisely into place in the mold. The ring will be locked in place, and the dome pulled forward and allowed to settle on the matrix. The curing bag can then be inflated to press the new rubber into the mold tread pattern.

When the dome is down on the matrix, it covers the entire matrix except for the outer peripheral portion of the cover which, being an insulator, will not allow heat to escape. The dome will serve as an efficient means to retain heat in the matrix and prevent its escape into the room. Because of this, the matrix heating costs are considerably reduced, and the temperature of the room is maintained at a comfortable level. The combination of the plastic dome and the plastic matrix cover provides a continuous plastic exposed surface over the top sides and a part of the bottom of the unit. Only the open center of the matrix at the bottom is uncovered, and, as heat rises, there is little heat loss as the heat is gathered in the dome.

The lifting and lowering of the matrix ring with the dome adds considerable life to the mold, as the ring is not worn or defaced by sliding over the top of the matrix, as has been the practice in the past.

While in the above one practical embodiment of the invention has been disclosed, it will be understood that the particular details of structure shown and described are merely by way of example, and the invention may take other forms within the scope of the appended claims.

What is claimed is:

1. A stand to support a ring-type tire matrix having a removable matrix flange ring, said stand comprising, a matrix supporting bed, a matrix supported on said matrix supporting bed, a matrix flange ring supported by said matrix, telescoping post sections forming respectively a cylinder and piston, one of said sections fixedly mounted at one side of the stand and the other of said sections telescopically slidable in said one section, means to admit fluid under pressure to said one fixedly mounted section to move said slidable other section from a retracted lowered position to an extended upper position, a lifting arm, connecting support means for supportingly connecting said lifting arm to said slidable other section, and a dome connected to the lifting arm to assume a seating position on said matrix on the supporting bed when said slidable other section is in its retracted lowered position.

2. A stand as claimed in claim 1, additionally including means interconnecting the lifting arm and matrix flange ring in order to move the ring to and from the matrix so that the matrix flange ring will move to and from the matrix on the supporting bed when the said slidable other post section is moved between its retracted lowered position and its extended upper position.

3. A stand as claimed in claim 2 additionally including an opening in the dome on the side of the dome adjacent the telescoping post sections with the lifting arm loosely extending through the opening in the dome so that the dome can be tilted upon the lifting arm independently of lifting arm movement and moved along the lifting arm to have the side of the dome remote from the post rest on the lifting arm.

4. A stand as claimed in claim 2 wherein, the lifting arm includes a rearwardly overhanging end which projects beyond the telescoping post on the side opposite the dome, said connecting support means includes a pivot connection between the lifting arm and said other post section, and additionally including a fixed part of the stand located below the lifting arm, a flexible tether connected between said rearwardly overhanging end of the lifting arm and said fixed part of the stand below the lifting arm.

5. A stand as claimed in claim 4 wherein said flexible tether is sufficiently long to be slack when the dome is in said seating position, and additionally including stop means to hold the lifting arm and dome from pivoting below an angle of parallelism with the matrix supporting bed, whereby initial upward telescoping movement of the said slidable other section of the post from its retracted lowered position will raise the dome and matrix flange ring from said seating position while remaining parallel to the matrix bed until the tether becomes taut, whereupon further upward movement will cause the lifting arm, dome and flange ring to tilt about the lifting arm pivot connection to the other post section.

6. A stand as claimed in claim 5 wherein, the dome is of molded plastic.

References Cited

UNITED STATES PATENTS

| | | | |
|---|---|---|---|
| 2,174,590 | 10/1939 | Meier | 18—18 |
| 2,266,720 | 12/1941 | Chambers | 18—18 |
| 2,267,243 | 12/1941 | MacMillan | 18—18 |
| 2,851,726 | 9/1958 | Eriksen | 18—18 |
| 3,109,197 | 11/1963 | Sunday | 18—18 |
| 3,166,787 | 1/1965 | Dennis et al. | 18—18 X |
| 3,337,918 | 8/1967 | Pacciarini et al. | 18—17 |
| 2,822,576 | 2/1958 | Rowe | 18—18 |
| 2,996,760 | 8/1961 | Dennis et al. | 18—18 |
| 3,200,443 | 8/1965 | Maddox et al. | 18—2 |
| 3,240,653 | 3/1966 | Mattox et al. | |

J. HOWARD FLINT, JR., *Primary Examiner.*

U.S. Cl. X.R.

18—2